Patented Aug. 25, 1953

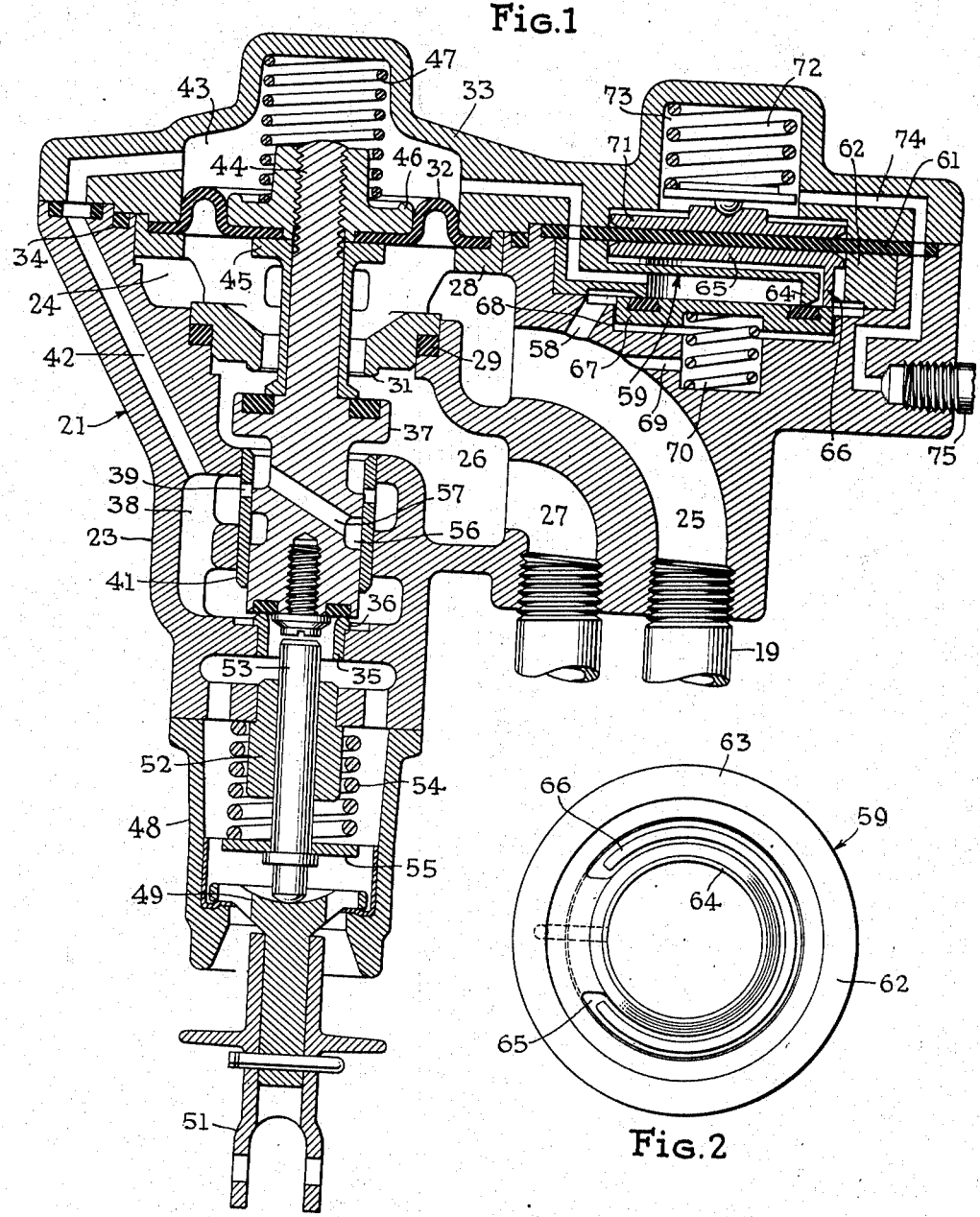

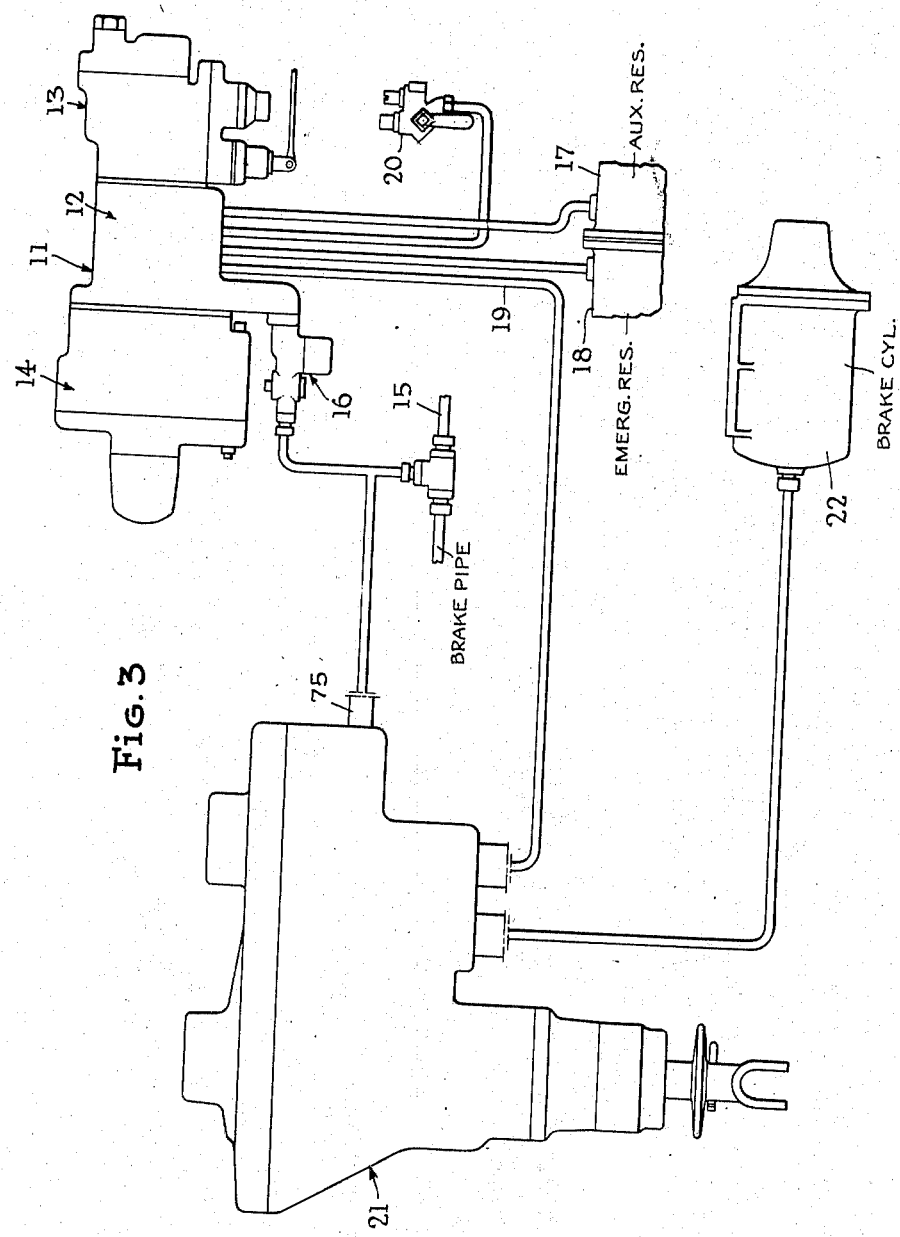

2,650,139

UNITED STATES PATENT OFFICE 2,650,139

BRAKE CYLINDER RELEASE VALVE

William F. Klein, Watertown, N. Y., assignor to The New York Air Brake Company, a corporation of New Jersey Application July 5, 1951, Serial No. 235,342

5 Claims. (Cl. 303—68)

This invention relates to release valves primarily intended for use in releasing the brakes on cars preparatory to setting them out of the train for switching operations. Specifically, it is concerned with a valve of this general type which is adapted to be interposed between the brake cylinder connection of a brake controlling valve and the brake cylinder associated with that brake cylinder connection.

The basic operation of the valve is the same as is characteristic of the release valve shown in the Pickert Patent No. 2,392,185 dated January 1, 1946. Release valves constructed according to the teachings of the denoted Pickert patent can be operated to vent the pressure from the brake cylinders whenever the brakes are applied.

It is common practice when a train is being operated on a long downhill grade to set the retaining valves so that a predetermined charge is maintained in the brake cylinders at all times. This charge is retained even though the control valves are in release position.

A release valve constructed according to the above Pickert patent can be operated to release the charge in the brake cylinders retained by the retaining valves. Also if the release valves were operated when the retaining valves were set to maintain some pressure above atmospheric the release valves did not reset after the brakes were released. This difficulty was overcome by applicant's earlier Patent No. 2,444,993 dated July 13, 1948.

Although the construction shown in applicant's prior patent enables the release valves to reset regardless of the setting of the retaining valves, it does not prevent operation of the release valves. It has been suggested that it would be desirable to prevent operation of the release valves under normal service conditions. The reason for this suggestion is that it would be possible for a train, proceeding with its brakes applied, to have some or all of its brake cylinders vented by accidental displacement of the release valve operating levers. The engineer, upon becoming aware of the situation, could reapply the brakes thus released only after he had first released the brakes on the entire train by operation of the engineer's brake valve. Hence, a potentially dangerous condition could arise, especially if the train was being operated on a grade.

While the possibility that an engineer would ever be faced by this situation is remote, it can be overcome and it is the purpose of this invention to provide a release of the general type shown in the Pickert patent, above, which cannot be operated when the normal service braking is in effect.

It will be recalled that release valves constructed according to the denoted Pickert patent are retained in their brake cylinder venting position by a pressure motor which is normally inert but which is actuated when the venting flow from the brake cylinder is initiated. The actuation of this motor occurs as a result of the creation of unbalanced pressures in the working chambers of the motor.

According to the present invention a by-pass connection is provided between these working chambers whereby the pressures in these chambers are normally equalized. Flow through the by-pass is controlled by a motor actuated pilot valve which is normally open. The motor which actuates this valve has two working spaces one of which is in communication with the brake cylinder connection and the other of which is in communication with the brake pipe. When a full service application is initiated the brake pipe may be usefully reduced to a predetermined pressure. Reduction of brake pipe pressure beyond this pressure does not result in the creation of a greater pressure in the brake cylinder because the pressures in the brake cylinder and the auxiliary reservoir from which it is supplied with pressure fluid will have become equal. The pressure motor which actuates the pilot valve in the by-pass is conditioned in response to a reduction of brake pipe pressure below the equalization pressure defined above to permit the valve in the by-pass to close. When the valve in this by-pass is closed, operation of the release valve in the normal manner described in the Pickert patent can be achieved.

The invention will be described by referring to the accompanying drawings in which:

Fig. 1 is an axial section of a preferred embodiment of the invention.

Fig. 2 is a detail bottom plan view of the pilot valve assembly.

Fig. 3 is a diagrammatic representation of the air brake equipment on a single freight car equipped with a release valve embodying the present invention.

The invention has been illustrated and will be described as it is used in conjunction with an AB brake which is conventional in freight service throughout the United States. It will be apparent that it could also be used in conjunction with other types of brake control valves and such use is contemplated.

Referring first to Fig. 3, reference numeral 11 generally indicates an AB type control valve. The control valve 11 comprises a pipe bracket portion 12, a service portion 13 and an emergency portion 14. The control valve 11 is supplied with pressure fluid through the brake pipe 15 and the combined cut-out cock and strainer assembly 16. Also leading from the pipe bracket 12 are the connections to the auxiliary reservoir 17 and the emergency reservoir 18.

The brake cylinder conection 19 extends from the pipe bracket 12 to the release valve mechanism generally indicated by the numeral 21. The brake cylinder 22 receives air from the connection 19 through the valve 21. Exhaust flow from the brake cylinder 22 passes from the connection 19 through appropriate ports in the control valve 11 to an exhaust line carrying the retaining valve 20.

Referring to Fig. 1, the body portion 23 of the release valve 21 encloses a chamber 24 which is in direct communication with an inlet passage 25 connected to the brake cylinder connection 19 and a chamber 26 which is in direct communication through a passage 27 with a pipe leading to the brake cylinder 22. Mounted in chamber 24 is a spider 28. A gasket 29 is provided to prevent leakage around the periphery of spider 28 into the chamber 26. A valve seat 31 is formed on the lower face of the spider 28.

A slack diaphragm 32 is clamped at its periphery between the upper face of the spider 28 and the lower face of the cap 33 of the release valve. Leakage between the cap 33 and housing 23 is prevented by the gasket 34. Provided in the lower portion of the body 23 is a bushing 35 having at its upper edge a valve seat 36. A double beat poppet valve 37 is reciprocable between an upper abnormal position in which it seats against the valve seat 31 and a lower normal position in which it seats against the valve seat 36.

Chamber 26 is in communication with a chamber 38 through the ports 39 in a bushing 41. A passage 42 extends upwardly from the chamber 38 to a working space 43 defined between the cap 33 and the slack diaphragm 32. Valve 37 is provided with a stem 44 which extends upwardly through an opening in the center of the diaphragm 32. The inner periphery of the diaphragm 32 is retained between a flanged sleeve 45 which encircles the stem 44 and a threaded member 46. The member 46 also serves as a spring seat for the coil compression spring 47 the other end of which reacts against the cap 33.

Attached to the lower end of the body 23 is a housing 48 which sustains the universally tiltable ported head 49 of the forked lever 51. Pressed into the lower end of the body 23 is a guide bushing 52 in which the stem 53 is reciprocable. The stem 53 is biased downward by a coil compression spring 54 reacting between the housing 23 and spring seat 55 attached to the stem 53. When the lever 51 is moved in any direction, the universally tiltable head 49 moves the stem 53 upwardly forcing the valve 37 to its upper position in which it seats against the valve seat 31 which isolates the chamber 24 from the chamber 26.

In the upper position of the valve, the diagonal port 57 through the valve 37 is placed in communication with chamber 38 through the ports 39 and the annular recess 56. Thus, the chamber 26 is vented to atmosphere through the chamber 38 and the ports provided in the universally tiltable head 49. At the same time the working space 43 is vented to atmosphere through the passage 42 which is in communication with the chamber 38. The valve 37 is maintained in its uppermost position by the pressure in the chamber 24 which reacts on the diaphragm 32 to overcome the downward bias of spring 47.

The apparatus described above is entirely conventional and no claims are directed to it apart from the particular improvement afforded by the present invention.

According to the present invention a by-pass 58 extends between the passage 25 and the working space 43. Flow through the by-pass 58 is controlled by a motor controlled pilot valve assembly 59. This assembly 59 comprises a flexible diaphragm 61 clamped between the cover 33 and the body 23 of the release valve. A valve seat member 62 is clamped between the diaphragm 61 and the body 23. Referring to Figure 2, the valve seat member 62 comprises an outer annular portion 63 and a central valve seat 64. A diaphragm follower 65 is disposed between the diaphragm 61 and the valve seat 64. This follower 65 has a generally U-shaped projection 66 which encircles a major portion of the valve seat 64. This follower 65 and the projection 66 react between the diaphragm 61 and the disc valve 67 which is reciprocable in guide cylinder 68. A spring 70 reacts between the body 23 and the valve 67. A port 69 admits pressure fluid from the passage 25 to the clearance space between the valve 67 and the body 23. A spring seat 71 is carried on the opposite face of the diaphragm 61. A spring 72 reacts between the seat 71 and the cap 33. The working space 73 above the diaphragm 61 is supplied with pressure fluid through a passage 74 which communicates with the pilot connection 75.

As shown in Figure 3, the pilot connection 75 extends between the brake pipe 15 and the release valve 21.

To facilitate understanding the operation of the invention the following definitions are given.

Service reduction: Any reduction of brake pipe pressure less than a full service reduction.

Full service reduction: A reduction of brake pipe pressure to a pressure equal to or slightly less than the pressure occurring in the brake cylinder as a result of equalization of the pressure existing in the auxiliary reservoir and in the brake cylinder.

Over-reduction: A reduction of brake pipe pressure during a service application to a pressure below the above defined equalization pressure.

When the brake pipe 15 is fully charged, the control valve 11 is in release position and the pressure in brake cylinder connection 19 is dissipated through the retaining valve 20. Under this condition the valve 67 is forced off its seat by brake pipe pressure reacting on the motor diaphragm 61 and by the bias of spring 72.

If a service reduction of brake pipe pressure is made, the pressure in the brake cylinder connection 19 acts upward on the diaphragm 61. The springs 70 and 72 are relatively so calibrated that the valve 67 remains open. If the lever 51 is operated to dissipate the pressure in the working space 43 and the brake cylinder 22, the valve 37 will be moved to its uppermost position. It will not however be maintained in this position if the lever 51 is released because the pressure in the working space 43 will be restored by flow through the by-pass 58.

If a full service reduction of brake pipe pressure is made the same conditions prevail insofar as operation of the release valve is concerned as prevailed after a service reduction.

If an over-reduction of brake pipe pressure is made the pressure beneath the diaphragm 61 will be greater than the pressure acting above the diaphragm and the bias of spring 72 will be overcome, thus permitting the spring 70 to close the valve 67 against its seat 64.

If the lever 51 is manipulated under these circumstances, the release valve 37 will be raised to its uppermost position and will be retained there against the bias of the spring 47, because the pressure in chamber 43 is not restored.

When the brakes are released after being applied by an over-reduction of brake pipe pressure, the pressure in the connection 19 is dissipated through the retaining valve 20, thus permitting the valve 37 to return to normal position. The dissipation of this pressure and the restoration of brake pipe pressure causes the diaphragm 61 to move downward whereby the valve 67 is forced off its seat.

An over-reduction of the brake pipe pressure is not normally encountered during train operation, hence it is possible to limit the operation of the release valves to those times when it is desired to vent the brake cylinders, as for example during switching operations.

The only other time that brake pipe pressure is reduced below the value characteristic of it during a full service application, is during an emergency application of the brakes.

In the brake system illustrated there is shown an emergency reservoir 18 which serves to supply additional pressure fluid to the brake cylinder. The brake cylinder pressure occurring as a result of an emergency application is higher than the pressure therein after a full service application. Since an emergency application is initiated by venting the brake pipe at a rapid rate, the pressure in the space 73 is reduced to atmospheric pressure at a time when pressure in the connection 19 is in the early stages of its build up. Even in the early stages this pressure will close the valve 67. In order that the valve 37 will not be accidentally shifted to venting position during the time when the brake cylinder pressure is being developed, it is necessary that the working space 43 be charged at a rate such that a pressure differential across the diaphragm sufficient to shift the valve 37 against the bias of spring 47 will not result. Since the valve 67 is closed in the initial stages of the emergency application, the connection 42 serves as a charging connection, fluid pressure being supplied to the space 38 through the radial ports 39 in the bushing 41.

It will be noted that when the valve 67 is closed, it is no longer in static pressure balance, but is biased against its seat by the pressure in the connection 19 which acts on a differential area of the valve equal to the area of the valve seat 64. The area of the seat 64 is made large so that an appreciably greater force holds the valve closed than was necessary to close it. This design serves to assure that the valve 37 will not reset before the service portion 13 is returned to release position, a position in which the auxiliary reservoir 17 and the brake cylinder 22 are isolated from each other. A premature opening of the valve 67 would cause the valve 37 to reset and waste auxiliary reservoir air. This premature reset would occur, unless prevented, because the auxiliary reservoir and the brake cylinder connection are each connected to the brake pipe to aid in recharging the latter when the brakes are released after an emergency application. This flow is initiated by movement of the slide valve in the emergency portion 14 to accelerated release position which occurs before the service portion 13 moves to its release position.

It will be seen that if the train is proceeding with the retainers set and control valves 11 in release position, a momentary accidental displacement of the levers 51 will not vent the charge retained in the brake cylinders. This results from the fact that the pilot valve 67 is always unseated when the brake pipe is fully charged.

The retaining valves 20 even though set to maintain a certain pressure in the cylinders do not prevent normal resetting of the release valves, because the pressures in the chambers 43 and 24 equalize through the by-pass 58 which is open when the brakes are released.

What is claimed is:

1. In a fluid pressure brake controlling system of the type including a control valve, a brake pipe, an auxiliary reservoir, an emergency reservoir, a brake cylinder, a brake cylinder connection from said control valve, the pressures in said auxiliary reservoir and said brake cylinder being equalized during a full service application of said brakes, and a self-restoring brake releasing mechanism interposed between said connection and said cylinder, said mechanism having a main valve having a normal position in which it permits flow between said connection and said cylinder and an abnormal position in which it seals said connection and vents said cylinder, fluid pressure motor means effective when actuated to maintain said valve in abnormal position, said motor means comprising in combination a movable abutment separating first and second working spaces; biasing means urging said abutment toward said first working space; a by-pass between said working spaces; a pilot valve controlling flow through said by-pass; an expansible chamber motor normally conditioned to maintain said pilot valve open, said motor having a first and a second working chamber separated by a movable wall, said first working chamber being in free communication with said connection, said second working chamber being in free communication with said brake pipe; yielding means urging said pilot valve toward its seat; means urging said wall toward a position in which said motor maintains said pilot valve open, said means and said yielding means being effective to close said pilot valve when the pressure in said brake pipe is less than said equalized pressure; and valve means whereby said second working space may be vented.

2. The combination defined in claim 1 in which the pressure in said connection acts on said pilot valve when said valve is closed to maintain it in closed position until pressure in said brake pipe is restored to an amount in excess of the pressure in said connection.

3. In a self-restoring brake releasing mechanism, interposed between the brake cylinder connection of a brake controlling valve and the brake cylinder of a fluid pressure brake controlling system, said system including said control valve, said cylinder, an auxiliary reservoir and a brake pipe, said mechanism being of the type including a release valve shiftable between a normal position in which flow between said connection and said cylinder is permitted and an abnormal position in which it seals said connection and vents said cylinder, said valve being maintained in said abnormal position by actuation of a normally inert pressure motor, said pressure motor comprising in combination a movable abutment connected to said release valve and having on its opposite faces a first and a second working space; means biasing said abutment toward said first working space, the first working space communicating with said connection; a by-pass between said working spaces; a pilot valve in said by-pass; yielding means urging said pilot valve closed; an expansible chamber motor normally effective to maintain said pilot valve open and having a first working chamber in communication with said connection and a second working chamber, said second working chamber being in communication with said brake pipe, the pressure in said brake pipe being at least equal to pressure in said connection unless an over-reduction of brake pipe pressure has been made, said expansible chamber motor being rendered ineffective to maintain said pilot valve open when an over-reduction occurs; and a vent valve whereby said second working space may be vented.

4. A self-restoring brake releasing mechanism of the type adapted for interposition between the brake cylinder connection and the brake cylinder of a fluid pressure brake controlling system, said system including at least a brake pipe, a brake control valve, an auxiliary reservoir, said brake cylinder connection and said brake cylinder, said releasing mechanism comprising a housing having therein two working spaces, the first of said working spaces being in constant communication with said connection; a movable abutment separating said spaces; a double beat poppet valve shiftable between a normal and abnormal position, said valve being maintained in said abnormal position by said abutment when the second of said working spaces is vented, means biasing said valve toward normal position, said valve effective in normal position to permit flow between said connection and said cylinder and effective in said abnormal position to isolate said connection and vent said cylinder and said second working space; a passage communicating with said second working space at one end and said brake cylinder at its other end, said passage serving as a fluid pressure inlet to said second working space when said double beat valve is in said normal position and as an exhaust passage from said second working space when said double-beat valve is in said abnormal position; means affording a flow connection between said first working space and said second working space; a pilot valve effective to control flow through said flow connection; yielding means biasing said pilot valve to closed position; fluid pressure motor means when actuated maintaining said pilot valve open in opposition to the bias of said yielding means; said fluid pressure motor means including two working chambers separated from one another by a movable abutment, one of said chambers being in communication with said brake cylinder connection and the other chamber being supplied with pressure fluid from said brake pipe, said motor means being actuated when pressure in said brake pipe exceeds pressure in said cylinder.

5. The combination defined in claim 4, in which said pilot valve comprises a disc valve which is in static pressure balance when open, but which when closed is biased against its seat by the difference which may exist between the pressure in said connection and in said second working space, said pressure difference acting on an area of the valve equal to the area of its seat.

WILLIAM F. KLEIN.

References Cited in the file of this patent

UNITED STATES PATENTS

| Number | Name | Date |
| --- | --- | --- |
| 2,322,823 | Brown | June 29, 1943 |
| 2,379,329 | Whitney | June 26, 1945 |
| 2,392,185 | Pickert | Jan. 1, 1946 |